US010467715B2

(12) United States Patent
Mason et al.

(10) Patent No.: US 10,467,715 B2
(45) Date of Patent: *Nov. 5, 2019

(54) SYSTEM AND METHOD FOR BUILDING MULTIPLE ONLINE LEGAL RESEARCH APPLICATIONS

(71) Applicant: Thomson Reuters Global Resources Unlimited Company, Baar (CH)

(72) Inventors: Eamon Mason, Surrey (GB); Andre Lambrechts, Baar (CH)

(73) Assignee: Thomson Reuters Global Resources Unlimited Company, Baar (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/434,594

(22) Filed: Feb. 16, 2017

(65) Prior Publication Data
US 2017/0161857 A1    Jun. 8, 2017

Related U.S. Application Data

(63) Continuation of application No. 12/534,692, filed on Aug. 3, 2009, now Pat. No. 9,607,057.
(Continued)

(51) Int. Cl.
*G06F 17/30* (2006.01)
*G06F 7/00* (2006.01)
(Continued)

(52) U.S. Cl.
CPC .............. *G06Q 50/18* (2013.01); *G06F 3/065* (2013.01); *G06F 3/067* (2013.01); *G06F 3/0619* (2013.01);
(Continued)

(58) Field of Classification Search
CPC ..................... G06F 17/30011; G06F 17/30867
(Continued)

(56) References Cited

U.S. PATENT DOCUMENTS 5,870,550 A      2/1999  Wesinger, Jr. et al.
6,141,659 A  * 10/2000  Barker .............. G06F 17/30634
(Continued)

FOREIGN PATENT DOCUMENTS

CN        102187360 B     5/2016
EP        2 332 116 A1    6/2011
(Continued)

OTHER PUBLICATIONS

International search report and written opinion issued in corresponding PCT Application No. PCT/IB2009/006694, dated Dec. 7, 2009, 8 pages.
(Continued)

*Primary Examiner* — Kuen S Lu
(74) *Attorney, Agent, or Firm* — Norton Rose Fulbright US LLP

(57) ABSTRACT

The present inventors devised, among other things, an application development system and method. One exemplary method entails providing a set of legal research application feature or functions and receiving a first configuration file from a user, selectively enabling or disabling one or more of the features to define a first legal research application on a first server for a first country. The method further entails receiving a second configuration file from a user, which similarly selectively enables of disables one or more of the features to define a second legal research application on a second server for a second country. The configuration files also customize the user interfaces accord to brand specific criteria for each of the countries.

22 Claims, 2 Drawing Sheets

Related U.S. Application Data

(60) Provisional application No. 61/137,712, filed on Aug. 1, 2008.

(51) Int. Cl.

| | | |
|---|---|---|
| *G06Q 50/18* | (2012.01) | |
| *G06F 16/25* | (2019.01) | |
| *G06F 16/22* | (2019.01) | |
| *G06F 16/2455* | (2019.01) | |
| *G06Q 10/10* | (2012.01) | |
| *G06F 3/06* | (2006.01) | |

(52) U.S. Cl.
CPC .... *G06F 16/2291* (2019.01); *G06F 16/24561* (2019.01); *G06F 16/252* (2019.01); *G06Q 10/10* (2013.01)

(58) Field of Classification Search
USPC .................. 707/999.003, 706, 779, 758
See application file for complete search history.

(56) References Cited

U.S. PATENT DOCUMENTS

| | | | |
|---|---|---|---|
| 6,167,369 A | 12/2000 | Schulze | |
| 7,036,121 B1 | 4/2006 | Casabona et al. | |
| 7,085,755 B2* | 8/2006 | Bluhm | G06F 17/30011 |
| 7,207,005 B2 | 4/2007 | Lakritz | |
| 8,165,911 B1* | 4/2012 | Sanil | G06Q 30/0205 |
| | | | 705/7.34 |
| 9,607,057 B2 | 3/2017 | Mason et al. | |
| 2004/0003388 A1 | 1/2004 | Jacquemot et al. | |
| 2004/0088142 A1* | 5/2004 | Ashley | H04L 41/0253 |
| | | | 702/184 |
| 2004/0138979 A1 | 7/2004 | Juhre et al. | |
| 2005/0149343 A1 | 7/2005 | Rhoads et al. | |
| 2005/0177358 A1 | 8/2005 | Melomed et al. | |
| 2005/0251488 A1 | 11/2005 | Saunders et al. | |
| 2006/0010434 A1* | 1/2006 | Herzog | G06F 9/44505 |
| | | | 717/168 |
| 2006/0156278 A1 | 7/2006 | Reager | |
| 2006/0277187 A1 | 12/2006 | Roese et al. | |
| 2007/0239706 A1* | 10/2007 | Zhang | G06F 17/30728 |
| 2007/0268523 A1* | 11/2007 | Ferrara | G06Q 30/02 |
| | | | 358/1.18 |
| 2007/0276854 A1* | 11/2007 | Gold | G06F 17/30696 |
| 2008/0071772 A1 | 3/2008 | Rosenoff et al. | |
| 2009/0217196 A1 | 8/2009 | Neff et al. | |
| 2009/0240689 A1 | 9/2009 | Fenne et al. | |
| 2010/0030749 A1 | 2/2010 | Dahn | |
| 2011/0156880 A1 | 6/2011 | Rygaard et al. | |
| 2014/0056181 A1 | 2/2014 | Croak et al. | |

FOREIGN PATENT DOCUMENTS

| | | |
|---|---|---|
| WO | 2004/061619 A2 | 7/2004 |
| WO | 2007/041688 A1 | 4/2007 |
| WO | 2008/033511 A2 | 3/2008 |
| WO | 2010/013140 A1 | 2/2010 |

OTHER PUBLICATIONS

International Preliminary Report on Patentability and written opinion issued in corresponding PCT Application No. PCT/IB2009/006694, dated Feb. 10, 2011, 7 pages.
Summons to attend oral proceedings in corresponding EP Application No. 09786197.5 dated Jan. 10, 2014, 10 pages.
First Office Action mailed in corresponding Chinese application No. 200980134243.1, dated Jun. 14, 2012.
Response to First Office Action filed in corresponding Chinese application No. 200980134243.1, dated Jan. 4, 2013.
Second Office Action mailed in corresponding Chinese application No. 200980134243.1, dated Apr. 3, 2015.
Response to Second Office Action filed in corresponding Chinese application No. 200980134243.1, dated Aug. 18, 2015.
Third Office Action mailed in corresponding Chinese application No. 200980134243.1, dated Nov. 2, 2015.
Response to Third Office Action filed in corresponding Chinese application No. 200980134243.1, dated Jan. 5, 2016.
Notification to Grant Patent Right for Invention mailed in corresponding Chinese application No. 200980134243.1, dated Mar. 4, 2016.
Decision to refuse issued in corresponding EP application No. 09786197.5, dated May 3, 2014.

* cited by examiner

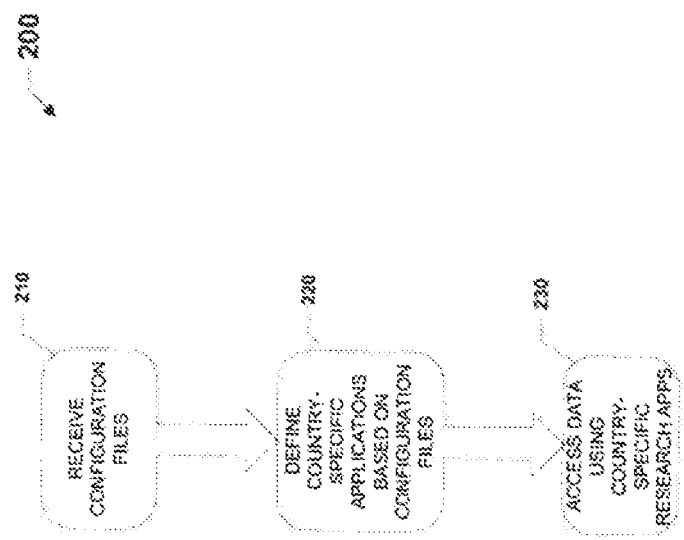

SYSTEM AND METHOD FOR BUILDING MULTIPLE ONLINE LEGAL RESEARCH APPLICATIONS

RELATED APPLICATION

The present application is a continuation application of U.S. patent application Ser. No. 12/534,692, which was filed on Aug. 30, 2009, which claims priority to U.S. Provisional Patent Application Ser. No. 61/137,712, which was filed Aug. 1, 2008, the contents of which are incorporated here in their entirety.

COPYRIGHT NOTICE

A portion of this patent document contains material subject to copyright protection. The copyright owner has no objection to the facsimile reproduction by anyone of the patent document or the patent disclosure, as it appears in the Patent and Trademark Office patent files or records, buy otherwise reserves all copyrights whatsoever. The following notice applies to this document: Copyright © 2017, Thomson Reuters.

TECHNICAL FIELD

Various embodiments of the present invention concern online legal research applications, particularly systems and method of efficiently providing these applications across multiple countries.

BACKGROUND

In many legal systems across the world, lawyers and other legal professionals research laws and past court decisions to help them serve the legal needs of their clients. To assist these legal professionals, businesses, such as Thomson Reuters, provide online legal research services, such as the popular Westlaw service, that provides not only rich databases and technically advanced search tools, but also sophisticated case analysis and alert functions. Thomson Reuters provides similar online legal research services in Argentina, Australia, Canada, Chile, Denmark, Hong Kong, Japan, New Zealand, South Africa, Spain, Sweden, Switzerland, and the United Kingdom.

One problem that the present inventors recognized is that developing and providing online legal research services, particularly the software applications that actually make it possible to deliver the services, is time consuming and expensive. Moreover, when providing these applications in multiple countries, which have different languages, laws and ways of organizing and researching laws and past legal decisions, the time and expense multiplies. The magnitude of these costs raises the question of whether the cost for developing or even updating a research application for smaller country, such as Argentina, Denmark, or Spain is justified given the size of the legal market and desire to achieve a reasonable return on investment.

Accordingly, the present inventors recognized a need for better ways of building online legal research applications.

SUMMARY

To address this and/or other needs, the present inventors devises, among other things, an application development system and method. One exemplary method entails providing a set of legal research application feature or functions and receiving a first configuration file from a user, selectively enabling or disabling one or more of the features to define a first legal research application on first server for a first country. The method further entails receiving a second configuration file from a user, which similarly selectively enables or disables one or more of the features to define a second legal research application on a second server for a second country. The configuration files also customize the user interfaces accord to brand specific criteria for each of the countries. Some systems embodiments employing the methodology outlined here support approximately 20 products in 12 countries using 7 different languages.

Moreover, the exemplary embodiments provide search templates that translate user input into a user interface into appropriate queries for the jurisdictional specific databases. The search templates can be shared across legal research applications, enabling, for example, users of an application for UK legal research to potentially research case law in Denmark.

Some embodiments also provide a configuration-selectable tocectory feature. This feature provides a hierarchical table-of-contents type method of navigating an searching legal contents, with the content associated with metadata that directs how it is to be displayed and what functionality a research application provides to interact with it.

Some embodiments operate beyond that legal domain. For examples, one or more embodiments operate in the financial, scientific, healthcare and media domains. So the present invention is not limited to legal research applications.

BRIEF DESCRIPTION OF THE DRAWINGS

FIG. 2 is a flow chart of an exemplary method of operating the system of FIG. 1 and of providing legal research applications, which correspond to one or more embodiments of the resent invention.

DETAILED DESCRIPTION

Figure 1:
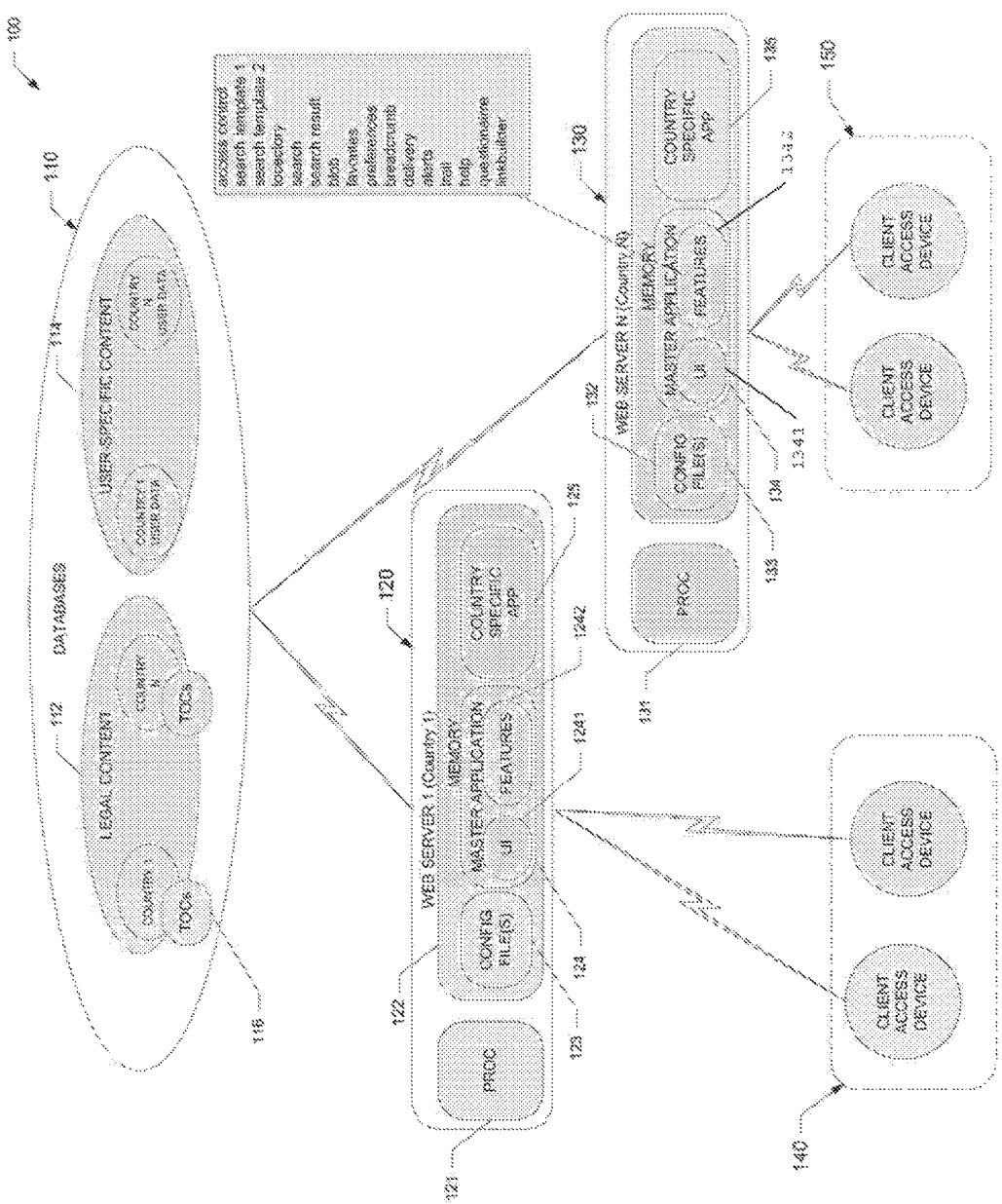
FIG. 1 is a block diagram of an exemplary multi-country legal research system which corresponds to one or more embodiments of the present invention.

This description, which incorporates the figures and the appended claims, describes one or more specific embodiments of an invention. These embodiments offered not to limit but only to exemplify and teach the inventive subject matter, are shown and described in sufficient detail to enable those skilled in the art to implement or practice the invention. Thus, where appropriate to avoid obscuring the invention, the description may omit certain information known to those of skill in the art.

Exemplary International Information-Retrieval System

FIG. 1 shows an exemplary international online information-retrieval (or legal research) system 100. System 100 includes one or more databases 110, server 120 and 130, and access devices 140 and 150.

Databases 110 include a set of legal research databases 112, and a set of user-specific content databases 114. Legal research databases 112, in the embodiment, include a case law, statutes, secondary legal research materials, and associated metadata for a variety of countries, delineated country 1 . . . country 2 in a figure. Secondary legal research materials include legal documents of secondary legal authority or more generally authorities subordinate to case law and statutes. Metadata includes case law and statutory citation relationships, KeyCite data (depth of treatment data, quotation data, headnote assignment data, and so forth. User-specific content database include user-preference data, user usage history, such as research trails. Breadcrumb data (information regarding documents accessed by a user), accounting data, subscription data, and authentication data.

Databases 110, which take the exemplary form of one or more electronic, magnetic, or optical data-storage devices, include or are otherwise associated with respective indices (not show). Each of the indices includes terms and phrases in association with corresponding document addresses, identifiers, and other conventional information. Databases 110 are coupled or couplable via a wireless or wireline communications network, such as a local-, wide-, private-, or virtual-private network, to servers 120 and 130.

Servers 120 and 130, which is generally representative of one or more servers for serving data in the form of webpages or other markup language forms with associated applets, ActiveX controls, remote-invocation objects, or other related software and data structures to service clients of various "thicknesses." More particularly, server 120 includes a processor module 121, a memory module 122, a configuration module 123, a master application module 124, and a country specific application module 125. Similarly, server 130 includes a processor module 131, a memory module 132, a configuration module 133, a master application module 134, and a country specific application module 135. (For clarity of illustration only two servers are shown in the figure; however, the exemplary embodiment encompasses any number of country specific web servers, indeed more than one server may be ganged for a particular company. In general, the functional capabilities of these servers are identical or similar.)

More specifically, processor modules 121 and 131 each include one or more local or distributed processors, controllers, or virtual machines. In the exemplary embodiment, the processor modules assume any convenient or desirable form.

Memory module 122 and 132, which take the exemplary form of one or more electronic magnetic, or optical data-storage devices, store respective master application modules 124 and 134 and country-specific research applications 125 and 135.

Configuration modules 123 and 133 include sets of one of one or more configuration files to enable or disable one or more respective legal research application features associated with master legal research applications 124 and 134. In the exemplary embodiment, the configuration module includes XML configuration files, style sheets, java scripts, and cascading style sheets, which enable or disable particular features of the master legal research application. The style sheets related primarily to customization of master user interface 1241 and 1341 to conform to country-specific branding. In this sense, these custom configured style sheets may be regarded as application "skins". Features 1242 and 1342 include the modular functional feature of the master application which are selectably enabled or disabled via the configuration files. Some embodiments allow for enabling or disabling or otherwise controlling operation one or more deeper aspects of the functional features, rather than just turning the feature completely on or off.

A description of an exemplary set of features follows. However, in various embodiments, the set of features is expandable to include new features that are designed to be configured by configuration files.

Searching Feature: The searching feature allows the user to search the whole application or within specific content sets for documents that suit their requirements. This can either be via a basic search that allows the user to input some basic words or via an advanced search where the user can input single or multiple pieces specific known information. The feature also allows the user to narrow search results by conducting further searches within results returned. The exemplary search feature can search multiple databases and integrate results into a single search result list and can search any field of any document (although limited by the content).

Browsing Feature: The first page the user arrives at after logging into the application allows the user to start research straight away. At the very top of the page is a toolbar with links to the most useful tools and features available on the application and this would be available on every page of the site. Users can choose to look at particular content types in more detail by using the navigation bar near the top of the page, which lists the content types available to them. Once a content type has been selected the user can browse for documents by selecting links to lists of documents that suit their requirements. Users can browse through the lists right down to document level or utilize the search templates available to narrow their search.

Result Display Feature: The results display feature of MAF finds documents that match the search criteria, sorts and de-duplicates them and then displays them to the user in the form of a list. As well as just displaying the list of search results, there are a number of features that are also available to the user via the search results list screens. Examples of these are:

Editing their search
Conducting a new search
Re-sorting the search results list
Searching within the results returned
Delivering the results list
Saving the search to be used at a later date
Adding the search to their alerts, RSS Feeds list and be alerted when new documents are added.

Document display feature: Document display UI design patterns within the application are the result of a combination detailed analysis, best practice and standards. As well as just displaying the document of choice, there are a number of additional features that are also available to the user via the document display feature. Some examples of these are:

Viewing related documents
Term scrolling
Results scrolling
Viewing recently viewed documents
Delivering documents
Delivery: Delivery options within WLUK allow the user to print, save or e-mail search results or full text documents. As well as simply delivering the documents the user has a number of other options that can be available to them. Some examples of these are:

Document format
Displaying highlighted search terms
Including summary pages
Underlining of links within the documents
Highlighting search terms Alerts Feature: An alert allows users to stay up-to-date on new documents added and notify the users when new information is added to the system. Alerts are requests that run automatically at pre-set time intervals and the results are delivered automatically to users via email. Results include only documents added since the last time the Alert request was run. Subscribers are able to view and manage a list of their own Alerts.

RSS Feeds Feature: RSS feed comprise XML feeds of new materials added to the site that are viewable by subscribers through the subscriber's web browser. Each time a specific RSS feed is built, the previous content of the RSS feed is overwritten, meaning that material contained in an earlier RSS field can only be retained if the subscriber opts to cache the previous feed. The overall functionality is similar to Alerts and like alerts, subscribers are able to view and manage a list of their own RSS feeds.

PDF circulation List: PDF circulation lists work as Alerts and allows a user to stay up-to-date on new documents added, and notifies the user when new PDF documents are added to the system. Circulation lists are requests that run automatically at pre-set time intervals and the results are delivered automatically to users via email. Results include only documents added since the last time the request was run and subscribers are able to view and manage a list of their own Circulation lists.

Breadcrumb: The Breadcrumb feature enables users to revisit pages of an application that they have previously accessed. When the user navigates to a new page, the path of navigation taken by the user will be listed in the breadcrumb and this allows the user to see where they have been within the application and to return to pages previously viewed if required.

Trail: Trail is a feature that records the sequence of events that have been executed by the user, to enable them to view and access research carried out during that session. Users are also able access Previous Trails to view previous research conducted in earlier sessions. This feature is access controlled and can be turned on an off as required.

Saved Search: This feature allows the user to save commonly used searches for re-use at a later date. Saved searches can be created from any search results list whether the search has been conducted from the homepage, content landing pages or at any level of the tocectory and users are able to view and manage a list of their own Saved Searches. This feature is access controlled and can be turned on and off as required.

Preference feature: Preference is a feature that allows the user to alter settings according to their requirements, such as the users time zones, the number search results returned per page, the number of terms in context extracts displayed, the users E-mail address and the users Delivery Output options and format. Once the user has amended their settings they remain as the default settings until they are further amended. In the exemplary embodiment, the following items within this feature can be also customized according to requirements for individual applications:

Format of date and time
Text
Language
Delivery option defaults
Available delivery formats
Available options for number of Terms in content extracts displayed
Available options for number of Search results displayed per page Access Control feature: Access Control feature is used to set the users access to different features within the application depending on their subscription. Most features within MAAF can be switched on and off via Access Control. Examples include:

Content sets
Alerts/RSS Feeds/PDFs
Delivery options
Preference
Trail
Saved Search Authentication Feature: Authentication Feature includes features such as logging in, new user login, changing passwords, forgotten password and timeout. Before a user can use any of the features within the application, they must first login. There are different ways a user can login depending on the kinds of users they are. Typical types of users are:

Users who access via a username and password
Users who use the IP authentication feature preventing from having to login when they view a doc from alerts results, a federated search tool or via other external links
Academic users who log in via a different login screen Billing feature: Billing is closely linked to Access Control. There are different levels of subscription and naturally different billing methods depending on the subscription type. The typical levels of subscription are:

Users with subscription to every feature of the application
Users with subscription to parts of the application where other content outside their subscription is completely blocked
Users with subscription to parts of the application where other content outside their subscription is on a Pay per View (PPV) basis.

Billing events are generated for the activities such as searching, viewing documents including PDFs, document delivery and acceptance of PPV items. Another feature within billing is the ability to use Client ID against billable activity to distinguish between research carried out for one client and another.

Web API feature: There are specific software providers who offer a range of federated searching tools for academic and commercial sectors. Web API Feature is an interface between the application and third party software providers in order to support federated searching. The Web API currently offers a search service and using third party software, a search request is sent to the application, and search results are returned to the end user. It is capable of searching all of the content collections configured for the application and searching of any of the configured fields appropriate to each collection. All the applications' collection sets and content sources would be available to the Federated searching tools. This is configurable to suit the end users needs, therefore bespoke collections sets that allow the users to search 2 specific content types at the same time could be created. There is also flexibility in the feature to search across all or specific fields available on basic and advanced templates for each collection as each customer will have different requirement for a federated search.

The search results displayed to the user are the same as if the search had been conducted within the application and contains all relevant links. By clicking links users can access the Document Display feature within the application, and view their selected document. Users also have the ability to be able to edit their search and conduct searches outside of the Federated Search tool.

Linkbuilder: The Linkbuilder feature is a user interface to build deep links and allow users to create direct links to content on the application. A link can be created to a search template, a search result or to a specific document on the application. Links created can incorporate IP and Athens authentication if required and the links be used for purposes such as bulletins, reading lists or for publishing on intranets. This feature is access controlled, can be switched on and off as required.

Help Page Feature: Help pages within the application provided the user with everything they need to use the application, from the basics to more advanced techniques to get the most from the service. Help pages detail the features available within the application and how to use them, information about the source of the content, and also provides contact information on how to contact Customer Support teams. In some embodiments, help pages are accessed via links from any screen but would typically be available from on search templates for all content types and at all levels of the tocectory, and for features such as Alerts and RSS feeds.

Questionnaire Feature: The training tutorial is an interactive tool designed to guide users through every aspect of the application. At the end of the tutorial the user is able to test their knowledge of the application with an interactive test consisting of multiple choice questions. Once the user has completed the test successfully they are able to download a Training Certificate.

In addition to the master user interface 1241 and master feature set 1242, master application modules include integration capacity responsive to configuration files 123 to create a country-specific application instance 125. Generally, these instances are created at startup of the server; however, in some embodiments they are persisted in memory between startups.

Coupled via wireless or wired network connection to servers 120 and 130 are respective sets of access devices 140 and 150. In the exemplary embodiment, each access device takes the form of a personal computer, workstation, personal digital assistant, mobile telephone, or any other device capable of providing effective user interface with a server or database. Though not shown in FIG. 1, each access device includes a processor module, one or more processors (or processing circuits), a memory, a display, a keyboard, and a graphical pointer or selector. In operation, each of the access devices enables access to databases 110 through interaction with one of serves 120 or 130. The access devices may operate as thin clients or thick clients depending on their specific hardware configurations and how much of the country specific application software the device host.

Exemplary Operation

FIG. 2 shows a flow chart 200 of one or more exemplary methods of operating a system, such as system 100. Flow chart 200 includes blocks 210-230, which like other blocks in this description, are arranged and described in a serial sequence in the exemplary embodiment. However, some embodiments execute two or more blocks in parallel using multiple processors or processor-like devices or a single processor organized as two or more virtual machines or sub processors. Some embodiments also alter the process sequence or provide different functional partitions to achieve analogous results. For example, some embodiments may alter the client-server allocation of functions, such that functions shown and described on the server side are implemented in whole or in part on the client side, and vice versa. Moreover, still other embodiments implement the blocks as two or more interconnected hardware modules with related control and data signals communicated between and through the modules. Thus, the exemplary process flow applies to software, hardware, and firmware implementations.

Block 210 entails receiving first and second sets of one or more configuration files. In the exemplary embodiment, the configuration files are XML files, and the include parameters for enabling or disabling one or more legal research application features of respective first and second master legal research application feature sets. These legal research sets are identical and are stored in different servers in the exemplary embodiment. However, in some embodiments, one of the legal research feature sets may include features not contained in the other.

Block 220 entails defining first and second country specific legal search applications based on the first and second configuration files and master legal research application feature sets. In the exemplary embodiment, the resulting country specific legal research applications are stored in respective first and second web servers.

Block 230 entails first and second users in different countries accessing data using the first and second country specific legal research applications. In the exemplary embodiment, this access may entail use of one or more of the features selectively enabled by the corresponding configuration file. One such feature is the "TOCetory," a portmanteau term formed from table of contents (TOC) and directory/A tocectory allows a user to navigate from the highest level in the site design down to an individual document by clicking through the hierarchical structure (TOCs 116, FIG. 1). A search template can exist at each level in the hierarchy. The scope of the search corresponds to the user's location within the hierarchy.

CONCLUSION

The embodiments described above are intended only to illustrate and teach one or more ways of practicing or implementing the present invention, not to restrict its breadth or scope. The actual scope of the invention, which embraces all ways of practicing or implementing the teachings of the invention, is defined only by the following claims and their equivalents.

What is claimed is:

1. An international online legal research system comprising:
   a set of one or more databases including first and second country-specific legal research databases;
   a first country-specific memory for storing first country-specific research applications associated with a first country;
   a second country-specific memory for storing second country-specific research applications associated with a second country;
   a first county-specific server for providing online access to the databases, the first county-specific server including one or more first country-specific configuration files including at least one parameter that indicates selective enablement or disablement of one or more legal research application features of a first set of legal research application features, and an instance of a first legal research application based on the one or more first country-specific configuration files and the first set of legal research application features; and
   a second country-specific server for providing online access to the databases, the second country-specific server including one or more second country-specific configuration files including at least one parameter that indicates selective enablement or disablement of one or more legal research application features of a second set of legal research application features, and an instance of a second legal research application based on the one or more second country-specific configuration files and the second set of legal research application features;

wherein each of the first and second sets of legal research application features includes a trail feature that stores a sequence of research-related events executed by a user for facilitating access to prior research conducted by said user, and a breadcrumb feature that is enabled for navigation to specific stored pages of the first and second country-specific applications previously accessed.

2. The system of claim 1 wherein the set of one or more databases associated with legal research are delineated by country and secondary legal research information.

3. The system of claim 1 wherein the first country-specific server executing a first country-specific research application accessed from the first country-specific memory.

4. The system of claim 1 further comprising: a first master application module that integrates the first country-specific configuration files thereby creating at least one instance of the first country-specific application and storing in the first country-specific memory for subsequent access by the first country-specific server.

5. The system of claim 1 wherein the second country-specific server executing a second country-specific research application accessed from the second country-specific memory.

6. The system of claim 1 further comprising:
a second master application module that integrates the second country-specific configuration files thereby creating at least one instance of the second country-specific application and storing in the second country-specific memory for subsequent access by the second country-specific server.

7. The system of claim 1 wherein the first and second sets of legal research application features are identical, wherein the legal research application features selectively enabled by the first country-specific configuration file, differs from the legal research application features selectively enabled by the second country-specific configuration file.

8. The system of claim 4 wherein the system further comprising at least one search template that translates user input into a user interface into appropriate queries for the first and second country-specific legal research databases, the search template being operative to be shared among the first and second legal research applications.

9. The system of claim 8 further comprising: a client access device for receiving the user interface, the user interface being customizable based on specific criteria associated with at least a first country as stored in the first master application module, the user interface thereby conforming to a first country-specific branding.

10. The system of claim 1, wherein the first and second legal research applications are tailored for respective first and second languages.

11. The system of claim 1, wherein each of the first and second sets of legal research application features includes a tocectory feature.

12. The system of claim 1, wherein each of the first and second sets of legal research application features include first and second search template for converting user input into respective first and second query languages.

13. The system of claim 1, further including first and second sets of one or more client access devices, wherein the first set of client access devices are located in a first country which has a first official language and the second set of client access devices are located in a second country which has a second official language, which is different from the first.

14. The system of claim 1, wherein the first country-specific configuration files include information for defining portions of a first user interface portion of the first legal research application, and the second country-specific configuration files include information for defining portions of a second user interface portion of the second legal research application.

15. A method of conducting country-specific online legal researches comprising:
receiving a first country-specific set of country-specific configuration files and a second country-specific set of country-specific configuration files, wherein at least one of the first and second sets of country-specific configuration files includes at least one parameter indicating enablement or disablement of a feature of a legal research application for a respective country with which the corresponding country-specific configuration file is associated;
generating an instance of a first legal research application, wherein the instance of the first legal research application is stored in a first country-specific web server and is based on applying the first set of country-specific configuration files against a first set of legal application features; and
generating an instance of a second legal research application, wherein the instance the second legal research application is stored in a second country-specific web server and is based on applying the second set of country-specific configuration files against a second set of legal application features;
wherein at least one of the first and second sets of country-specific configuration files indicates enablement or disablement of a trail feature that stores a sequence of research-related events executed by a user for facilitating access to prior research conducted by said user, and a breadcrumb feature that is enabled for navigation to specific stored pages of the first and second country-specific applications previously accessed.

16. The method of claim 15, wherein the feature of the legal research application included in the at least one of the first and second sets of country-specific configuration files is an access control feature.

17. The method of claim 15 wherein the first and second country-specific web servers includes respective identical first and second country-specific sets of legal research application features.

18. The method of claim 15 further comprising integrating the first set of country-specific configuration files using a first master application module thereby creating at least one instance of the first country-specific application and storing in the first country-specific memory for subsequent access by the first country-specific web server.

19. The method of claim 15 further comprising integrating the second set of country-specific configuration files using a second master application module thereby creating at least one instance of the second-country specific application and storing in the second country-specific memory for subsequent access by the second country-specific web server.

20. The method of claim 15 wherein each of the first and second sets of country-specific configuration files indicates selective enablement or disablement of one or more legal research application features, wherein the legal research application features enabled by the first county-specific configuration file differs from the legal research application features enabled by the second country-specific configuration file.

21. The method of claim 15 wherein at least one search template translates users input into a user interface into appropriate queries for first and second country-specific legal research applications, the search template being operative to be shared among the first and second legal research applications.

22. The method of claim 21 further comprising receiving the user interface in a client access device, the user interface being customizable based on specific criteria associated with at least a first country as stored in the first master application module, the user interface thereby conforming to a first country-specific branding.

* * * * *